Sept. 27, 1960 E. L. C. WHITE 2,954,475

TELEVISION CAMERA OR LIKE HEAD AMPLIFIER ARRANGEMENTS

Filed April 5, 1955

Inventor
E. L. C. White
By Haseltine, Lake & Co. (signature)
Attys 2,954,475

TELEVISION CAMERA OR LIKE HEAD AMPLIFIER ARRANGEMENTS

Eric Lawrence Casling White, Iver, England, assignor to Electric & Musical Industries Limited, Hayes, England, a company of Great Britain Filed Apr. 5, 1955, Ser. No. 499,459

Claims priority, application Great Britain Apr. 10, 1954

7 Claims. (Cl. 250—206)

The present invention relates to television camera or like head amplifier arrangements and, particularly, but not exclusively, to such arrangements employing camera pick-up tubes of the type having an output connection directly from the signal plate. One example of a camera pick-up tube of this type is the so-called cathode potential stabilised tube described in an article in the Journal of the Institution of Electrical Engineers, volume 97, part III, No. 50., entitled "C.P.S. Emitron Tube and Camera Circuits."

In existing television camera head amplifier arrangements where the output is obtained directly from the signal plate the first stage of the head amplifier is driven from what is virtually an infinite impedance source, namely, the pick-up tube and the first stage of the head amplifier is one employing an amplifying valve of the thermionic type. The arrangement thus entails the coupling of a virtual constant current source, that is to say the pick-up tube, with a voltage operated device, namely, the first thermionic amplifying valve. Such a coupling is inconvenient since it introduces noise into the system and furthermore gives rise to a non-uniform frequency response. Thus it is common practice to cause the output currents from the pick-up tube to flow in a load resistor of large value so as to set up potentials for driving the first stage of the head amplifier, and with such an arrangement not only do thermal agitation effects in the load resistor cause random noise fluctuations to be superposed upon the television signal but the stray capacity of the circuit in association with the large magnitude of load resistor gives rise to a frequency response with a considerable droop towards the high frequency end of the operating range of frequencies. If a large value of load resistor is not used then noise/signal ratio in the lower frequency portion of the operating range tends to be excessive.

It is an object of the present invention to provide a television camera or like head amplifier arrangement which permits of a more convenient form of coupling between the pick-up tube and the first stage of the head amplifier and in which the performance in regard to either fluctuation noise or uniformity of frequency response, or both of these criteria, is improved.

According to the present invention there is provided a circuit arrangement comprising a pick-up tube which operates as a virtual constant current source, and a head amplifier for amplifying signals derived from said tube, the initial stage of said amplifier comprising a transistor. Preferably the transistor is of the so-called junction type. If desired one or more other transistor amplifying stages may be employed before the first thermionic valve amplifying stage.

Figure 1:
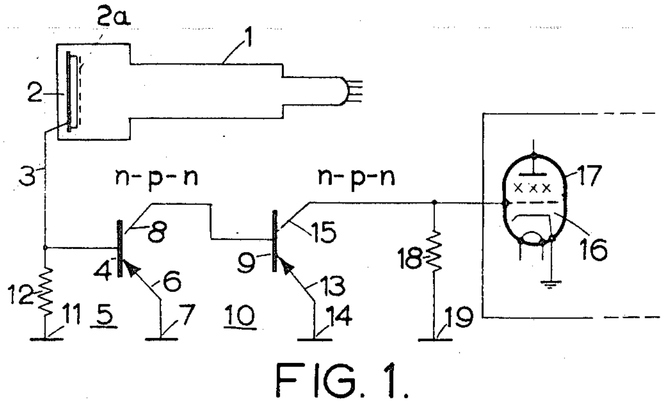
Figures 2, 3:
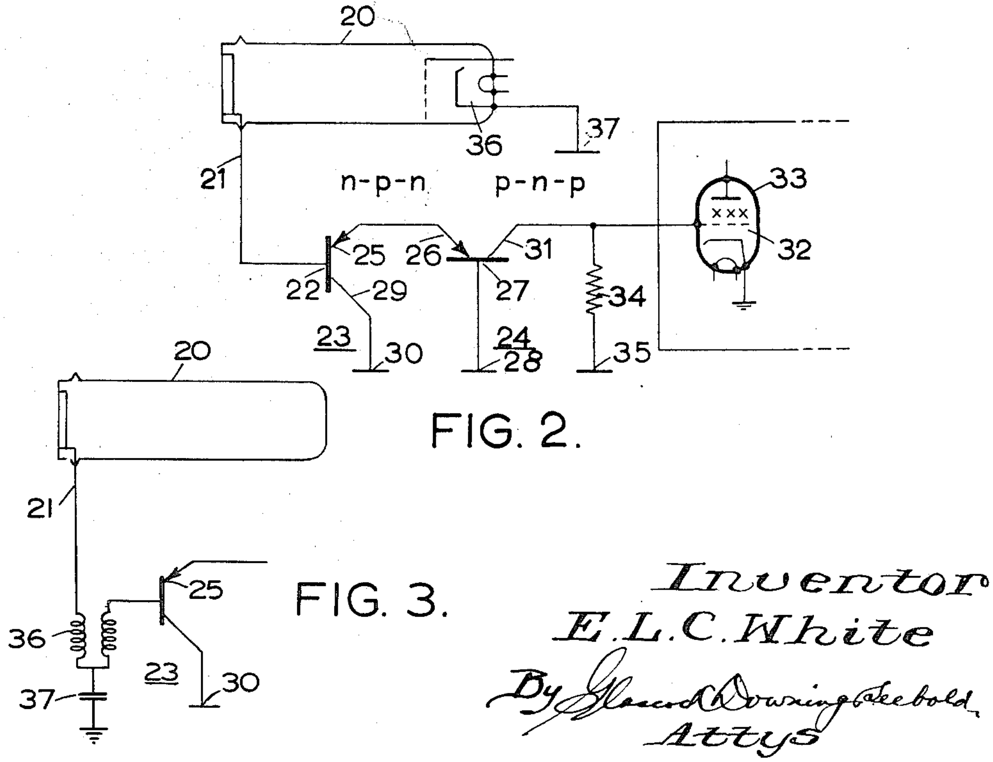

In order that the invention may be clearly understood and readily carried into effect, the same will now be described by way of example with reference to the accompanying drawings, in which:

Figure 1 illustrates an arrangement in accordance with one example of the invention, Figure 2 illustrates another arrangement according to the invention, and Figure 3 illustrates a modification of Figure 2.

Referring to Figure 1, reference numeral 1 indicates a photo-emissive pick-up tube such as a cathode potential stabilised tube of the type above referred to, the output electrode or so-called signal plate 2 of which is connected directly via the conductor 3 to the base 4 of the transistor 5. The signal plate 2 is, in known manner, applied to one surface of a dielectric layer which has a mosaic screen 2*a* applied to its other surface, the mosaic screen comprising mutually insulated photo-emissive elements by which a charge image can be stored representing an incident light image. A signal output representing the charge image can be derived from the mosaic 2*a* by scanning it with a beam of electrons in known manner and a tube of this consideration, in which the signal output is derived directly from the signal plate, operates as a virtual constant current source. The transistor 5 is connected in grounded emitter fashion and the emitter 6 is accordingly connected to a source of suitable fixed potential represented at 7. The collector 8 of the transistor is connected directly to the base 9 of the second transistor 10 and in order to operate the transistor 5 at a suitable point on its characteristic the base 4 is connected to an appropriate source of fixed potential indicated at 11 via a high resistance 12. Assuming that the amplitude of signal derived from the pick-up tube 1 is of the order of 0.1 $\mu$A, the resistor 12 may be chosen so as to carry a current of 0.2 $\mu$A, this current then being the current taken by the transistor at its base electrode.

The emitter 13 of the second transistor 10 is connected to a source of fixed potential indicated at 14 in a manner similar to the connection of the emitter 6 of the first transistor to the source 7. The collector 15 of transistor 10 is connected directly to the control grid 16 of the thermionic amplifying valve 17 which constitutes the first such valve in the head amplifier. The collector 15 is also connected via a load resistor of relatively low value, namely, the resistance 18 to a source of fixed potential at 19. This last source provides the control grid bias for the thermionic valve 17. By a suitable choice of the potentials of the sources 11, 7 and 14 the bias source 19 also serves to provide the correct potential for the collector 15 of the transistor 10. The potential of the source 19 is suitably chosen as −2 volts so that the cathode of the valve 17 being grounded, this potential acts as the bias on the control grid 16. Suitable values for the potentials of the sources 11, 7 and 14 are respectively −10 volts, +10 volts and +5 volts, the resistor 12 having the value of 100 megohms and the resistor 18 having the value of 5 kilohms. Both the transistors 5 and 10 are of the n-p-n type.

The arrangement whereby the output electrode of the tube 1 is connected directly to the base of the transistor 5 is desirable because a transistor, when operated in a grounded emitter fashion, has a relatively high current gain between its input and output circuits. However the transistor may in some cases have its emitter 6 connected to the signal plate 2 of the tube 1, the transistor in that case providing an impedance gain only.

The arrangement of Figure 2 is generally similar to that of Figure 1 except that the pick-up tube is of the photo-conductive type, in which the target comprises a layer of photo-conductive material having a signal plate applied to the surface opposite that which is scanned by the electron beam. In such a tube there is no need to provide a bleed resistor for the first transistor as is done in the arrangement of Figure 1 by the inclusion of the resistor 12. Thus the output electrode of the pick-up tube 20 is connected directly via the conductor 21 to the base 22 of the transistor 23 and no other connection is made to the base 22. The transistor 23 is followed in the signal channel by the transistor 24 and this latter transistor is arranged to be of opposite kind to the transistor 23. Thus the transistor 23 is of n-p-n type and the transistor 24 is of p-n-p type. By this choice the output from the transistor 23 can conveniently be taken from its emitter 25 and used to drive the emitter 26 of the transistor 24 which operates in grounded base manner by virtue of the connection of the base 27 to the source of fixed potential shown at 28. The collector 29 of transistor 23 is connected to a source of suitable potential at 30. The transistors 23 and 24 thus operate in manner analogous to cathode follower and grounded grid stages respectively, and the output from transistor 24 is derived from its collector 31 which is connected directly to the control grid 32 of the thermionic amplifying valve 33 corresponding to the thermionic amplifying valve 17 in Figure 1. Separately the collector 31 is connected via a resistor 34 serving as a load for transistor 24 to a source of potential at 35. This source of potential acts as the bias for the control grid 32 of the amplifier valve 33 and also provides the appropriate bias for the collector 31 of transistor 24. The potentials of the sources 30 and 28 are correspondingly suitably chosen. The potential of source 35 may be −2 volts so that the bias supplied to the valve 33, the cathode of which is grounded, is also −2 volts and the potentials of the sources 30 and 28 may be selected as −15 volts and −10 volts respectively. The cathode 36 of the pick-up tube 20 is connected to the source 37 which may be chosen so that the cathode 35 is operated at a potential of −30 volts. In some cases as illustrated in Figure 3, a step down transformer 36 may be arranged between the pick-up tube and the input electrode of the transistor of the first amplifying stage and this transformer may take the form of a filter section comprising two series coils arranged to couple with one another and having a shunt capacitor 37 connected between the junction of the coils and ground. Figure 3 may otherwise be identical to Figure 2 and for this reason is shown only in part, corresponding components in the two figures being denoted by the same references.

The invention has been described as applied to transistors of the junction type since their noise is generally lower than that of point contact transistors, nevertheless in some cases it may be possible to use point contact transistors. In order to reduce the effect of noise components of frequency below line scan frequency in which range noise derived from a transistor tends to be relatively large, a D.C. restoration circuit of clamp type such as described for example in the specification of United States Patent No. 2,190,753 and operating at line repetition frequency may be employed in the signal channel at a point subsequent to the transistors. Furthermore the invention is not confined to television pick-up tubes but may be applied to pick-up tubes used for other purposes, such as for example temporary storage.

What I claim is:

1. A circuit arrangement comprising an image pick-up target comprising a photo-electrically sensitive element and a signal electrode adjacent said element, means for scanning said element to induce electrical signals in said signal electrode, and a multistage head amplifier for said signals, the first stage of said amplifier comprising a transistor having an input electrode connected to said signal electrode, and an output electrode coupled to the next stage of said amplifier.

2. An arrangement according to claim 1 wherein the next stage of said amplifier comprises a second transistor, said first transistor having its base electrode connected directly to the signal electrode of said target, having its collector electrode grounded, and having its emitter electrode connected directly to the emitter of said second transistor, and said second transistor having its base electrode grounded, whereby amplified signals can be derived from the collector electrode of said second transistor.

3. An arrangement according to claim 1 comprising a step down transformer arranged between said signal electrode and the input electrode of said transmitter, to connect said two electrodes.

4. An arrangement according to claim 1 wherein said target comprises a photo-emissive element and a signal plate in close contact with said element, said signal plate being connected directly to said input electrode of said transistor.

5. An arrangement according to claim 1, said target comprising a photo-conductive element and a signal electrode in close contact with said element, said signal plate being connected directly to said input electrode of said transistor.

6. An arrangement according to claim 1 wherein said transistor is of the junction type.

7. An arrangement according to claim 1 wherein said signal electrode is connected directly to the base of said transistor.

References Cited in the file of this patent

UNITED STATES PATENTS

| | | |
|---|---|---|
| 2,148,482 | Lorenz | Feb. 28, 1939 |
| 2,522,521 | Kock | Sept. 19, 1950 |
| 2,547,386 | Gray | Apr. 3, 1951 |
| 2,550,518 | Barney | Apr. 24, 1951 |
| 2,585,078 | Barney | Feb. 12, 1952 |
| 2,589,704 | Kirkpatrick et al. | Mar. 18, 1952 |
| 2,632,040 | Rabinow | Mar. 17, 1953 |
| 2,675,499 | Sears | Apr. 13, 1954 |
| 2,691,076 | Moore et al. | Oct. 5, 1954 |
| 2,735,049 | De Forest | Feb. 14, 1956 |
| 2,749,463 | Pierce | June 5, 1956 |
| 2,789,164 | Stanley | Apr. 16, 1957 |
| 2,848,658 | Mitchell | Aug. 19, 1958 |